United States Patent
Schinkinger (10) Patent No.: US 10,343,311 B2
(45) Date of Patent: Jul. 9, 2019

(54) METHOD FOR PRODUCING A REINFORCEMENT ROD

(71) Applicant: ASA.TEC GmbH, Langenlois (AT)

(72) Inventor: Thomas Schinkinger, Alkoven (AT)

(73) Assignee: ASA.TEC GmbH, Langenlois (AT)

( * ) Notice: Subject to any disclaimer, the term of this patent is extended or adjusted under 35 U.S.C. 154(b) by 243 days.

(21) Appl. No.: 14/889,213

(22) PCT Filed: May 15, 2014

(86) PCT No.: PCT/AT2014/050119
§ 371 (c)(1),
(2) Date: Nov. 5, 2015

(87) PCT Pub. No.: WO2014/183146
PCT Pub. Date: Nov. 20, 2014

(65) Prior Publication Data
US 2016/0089820 A1    Mar. 31, 2016

(30) Foreign Application Priority Data
May 17, 2013   (AT) ............................... A 50338/2013

(51) Int. Cl.
  *B29C 41/30*   (2006.01)
  *B29C 70/52*   (2006.01)
  (Continued)

(52) U.S. Cl.
CPC ............ *B29C 41/30* (2013.01); *B29C 70/521* (2013.01); *E04C 5/07* (2013.01); *B29L 2031/707* (2013.01)

(58) Field of Classification Search
CPC ......... B29C 41/30; B29C 70/521; E04C 5/07; B29L 2031/707
See application file for complete search history.

(56) References Cited

U.S. PATENT DOCUMENTS 4,892,764 A   1/1990 Drain et al.
5,182,064 A   1/1993 Ishizuka et al.
(Continued)

FOREIGN PATENT DOCUMENTS

DE   60 2005 005 714 T2   7/2008
EP       0 667 228 A1   8/1995
(Continued)

OTHER PUBLICATIONS

International Search Report of PCT/AT2014/050119, dated Sep. 17, 2014.
(Continued)

*Primary Examiner* — Robert J Grun
(74) *Attorney, Agent, or Firm* — Collard & Roe, P.C.

(57) ABSTRACT

The invention relates to a method for producing a reinforcement rod (2) from a fibrous composite material consisting of continuous mineral fibers (5, 23, 35) and at least one resin (7, 25), at least one portion of the mineral fibers (5, 23) being mixed with a resin-curing agent mixture, the mineral fibers (5, 23) that have been mixed with the resin-curing agent mixture and, optionally, resin-free mineral fibers (35) subsequently being brought together to form a rod, and the resin (7, 25) being cured. A mixture of at least one resin (7, 25) and at least two different curing agents is used as said resin-curing agent mixture, the two curing agents forming reactive species under different conditions for curing the resin (7, 25) such that the reactive species are available for the curing process at different times.

10 Claims, 2 Drawing Sheets

(51) Int. Cl.
*E04C 5/07* (2006.01)
*B29L 31/00* (2006.01)

(56) References Cited

U.S. PATENT DOCUMENTS

| | | |
|---|---|---|
| 5,217,654 A | 6/1993 | Buckley |
| 5,539,012 A | 7/1996 | Klemarczyk et al. |
| 5,876,553 A | 3/1999 | Kaiser |
| 7,867,568 B2 | 1/2011 | Hillermeier et al. |
| 2009/0023870 A1 | 1/2009 | Berksoy et al. |

FOREIGN PATENT DOCUMENTS

| | | |
|---|---|---|
| EP | 0 733 465 A1 | 9/1996 |
| EP | 0 798 321 A2 | 10/1997 |
| JP | S53-63474 A | 6/1978 |
| JP | S55-37351 A | 3/1980 |
| JP | H0489346 A | 3/1992 |
| JP | H09136361 A | 5/1997 |
| JP | 2008030443 A | 2/2008 |
| UA | 66350 C2 | 2/2001 |
| UA | 98513 C2 | 5/2012 |
| WO | 94/21455 A1 | 9/1994 |
| WO | 95/22437 A1 | 8/1995 |

OTHER PUBLICATIONS

Aslan 100 Product Data Sheet (Aslan 100 Glass Fiber Reinforced Polymer (GFRP) Rebar) dated Nov. 10, 2011, total of 2 pages.
BP-TUF_BAR Brochure (TUF-BAR 40 GPa Straight bar) (2016), total of 2 pages.
Rockworm Rebar Brochure (Rockworm RWBp (polyester resin) rebar) (2018), total of 5 pages.

Fig.4

METHOD FOR PRODUCING A REINFORCEMENT ROD

CROSS REFERENCE TO RELATED APPLICATIONS

This application is the National Stage of PCT/AT2014/050119 filed on May 15, 2014, which claims priority under 35 U.S.C. § 119 of Austrian Application No. A 50338/2013 filed on May 17, 2013, the disclosure of which is incorporated by reference. The international application under PCT article 21(2) was not published in English.

The invention relates to a method for producing a reinforcement rod from a fibrous composite material consisting of continuous mineral fibers and at least one resin, whereby at least one portion of the mineral fibers is mixed with a resin-curing agent mixture and then the mineral fibers that have been mixed with the resin-curing agent mixture and, optionally, resin-free mineral fibers are brought together to form a rod and the resin is cured, as well as the use of a resin-curing agent mixture comprising at least one resin and at least two different curing agents for producing a reinforcement rod made from mineral fibers.

Reinforcement rods for reinforcing concrete are usually made from metal, in particular steel. However, it has also become increasingly common to use composite materials as reinforcing materials instead of metal reinforcement rods. In particular, these include fiber-reinforced plastics.

For example, EP 0 667 228 A1 and EP 0 733 465 A1 describe a pultrusion process for producing a glass fiber-reinforced reinforcement rod from a synthetic resin, which constitutes the matrix for the glass fibers. In order to produce grooves on the outer surface of the reinforcement rod, a tape is wound round the glass fibers mixed with the resin prior to curing the resin, after which the resin is cured and the tape is then removed.

The pultrusion process as such is known from the prior art. In principle, a distinction is made between the so-called open method and the closed method.

In the case of the open method, the reinforcing fibers are fed via a pan roller from their storage positions to a resin bath. A carding grid ensures the desired distribution of the fibers in the subsequent profile. They are impregnated with synthetic resin in a resin bath and are fed through several preforming stations which form the fiber resin mixture ever closer to the ultimately desired shape. Unlike the closed method, the pultrudate is cured on an open run.

In addition to using a tape to produce the grooves, another option known from the prior art is to mill the grooves into the rod once the resin has cured.

The objective of this invention is to propose an improved reinforcement rod.

This objective is achieved on the one hand by a method of the type outlined above and on the other hand by the use outlined above, and in the case of the method, a mixture of at least one resin and at least two different curing agents is used as a resin-curing agent mixture, and the two curing agents form reactive species under different conditions for curing the resin so that the reactive species are available at different times for the curing process, and in the case of the use, the two curing agents form reactive species under different conditions for curing the resin so that the reactive species are available at different times for the curing process.

The advantage of this is that by staggering the time at which the reactive species are generated from the curing agents, the overall time for curing and crosslinking the resin is made longer, which means that reaction heat released during the reaction does not lead to "overheating" of the reinforcement rod. Potential damage to the reinforcement rod, in particular due to the formation of tears, can thus be better prevented or avoided.

The curing agents are preferably selected from the group of radical formers, such as for example peroxides, azo compounds, photoinitiators and mixtures thereof. This therefore makes the curing process simple, based on an increase in temperature, i.e. the formation of the reactive species is initiated by an increase in temperature. This also offers a simple way of con-trolling the curing process because the curing agent generates the respective reactive species at a different temperature. In addition, the released reaction heat can be used for the reaction, thereby reducing the amount of energy needed.

It is preferable if three different peroxides are used as the curing agents because this further enhances the effects described above.

To ensure that the crosslinking reaction of the resin is not started too quickly, the curing agent which forms the reactive species first of all is used in a quantity that is the smallest relative to the respective quantities of the other curing agents of the resin-curing agent mixture.

Based on another embodiment of the method, a core rod may be produced from the mineral fibers and resin, which is then provided with a peripheral laminate consisting of mineral fibers and resin, and in order to produce the core rod, a different curing agent system from that used to produce the peripheral laminate is used, in particular one curing agent fewer is used than in the resin-curing agent mixture used to produce the peripheral laminate. By opting for the split design of core rod and peripheral laminate, a separate mineral fiber/resin layer is provided for producing the surface structure of the reinforcement rod. As a result, the mineral fibers in the core rod remain at least substantially undisturbed, i.e. undulation of the mineral fibers does not occur at all or if it does, only in regions of the core rod close to the surface, when subsequently winding a strand around the peripheral laminate to form a grooved structure prior to the curing process. This enables the flow of force through the core rod to be improved accordingly. Due to the different curing agent mixtures, in particular by using a curing agent mixture with one curing agent fewer for crosslinking the core rod, crosslinking of the resin to form the core rod before applying the peripheral laminate to the core rod is not fully completed. This means that crosslinking points for crosslinking the peripheral laminate resin are still available for crosslinking the core rod resin, thereby resulting in a higher bonding strength between the core rod and peripheral laminate.

To provide a clearer understanding, the invention will be described in more detail below with reference to the appended drawings.

These are schematically simplified diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

From the outset, it should be pointed out that by reinforcement rod is meant a rod which is embedded in a matrix made from a different material from that of the reinforcement rod for the propose of reinforcement, in order to impart better mechanical properties, in particular a higher tensile strength and/or higher compressive strength and/or higher shear strength. The reinforcement rod is preferably used to reinforce concrete. The reinforcement rod may also be embedded in the material to be reinforced in a mechanically tensed arrangement.

Figure 1:
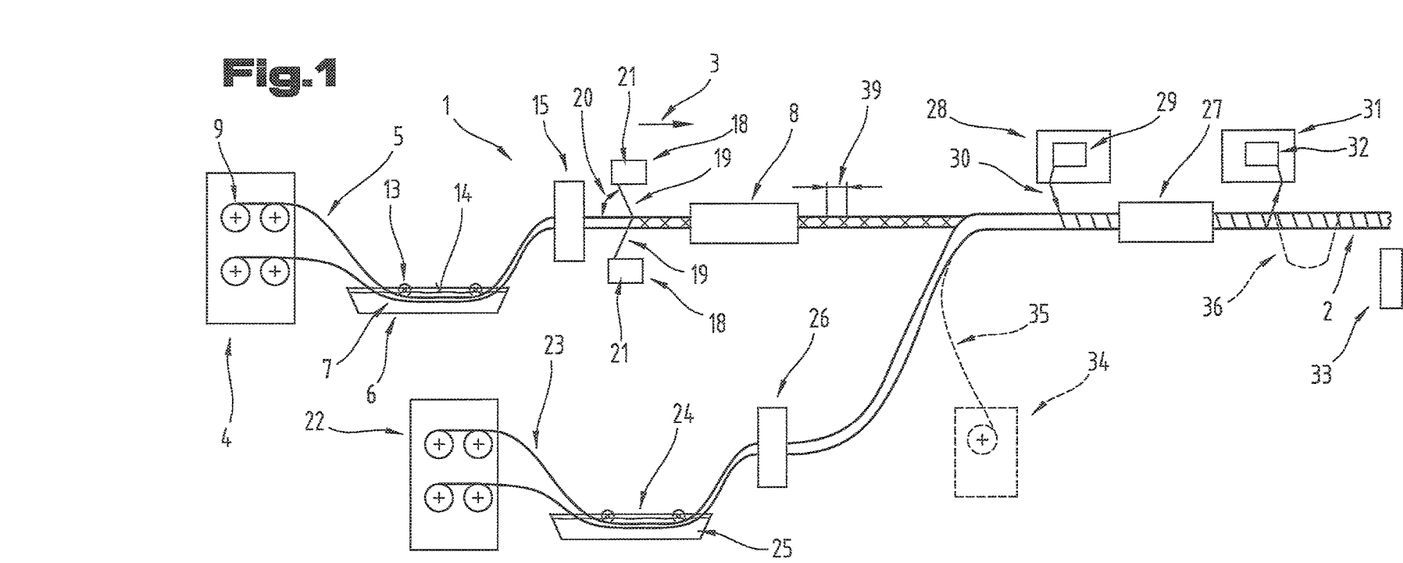
FIG. 1 an embodiment of a plant for producing a reinforcement rod.

FIG. 1 illustrates the preferred embodiment of a plant 1 for producing a reinforcement rod 2. The plant 1 is designed as an open pultrusion plant or pull winding plant.

In the production direction indicated by arrow 3, the plant 1 comprises, disposed one after the other, a device 4 for supplying continuous mineral fibers 5, a device 6 for mixing the mineral fibers 5 with a resin 7 through which the mineral fibers 5 are conveyed, and a device 8 for curing the resin 7.

A mineral fiber within the meaning of the invention is a roving consisting of a bundle, strand or multifilament yarn specifically comprising filaments disposed in parallel.

The continuous mineral fibers 5 used are preferably vulcanite fibers, in particular basalt fibers or andesite fibers. However, it would also be possible to replace at least some of the vulcanite fibers, in particular basalt fibers or andesite fibers, with other fibers, in particular glass fibers and/or carbon fibers. The expression "at least some" in this context should be understood as meaning that the proportion of fibers other than vulcanite fibers, in particular basalt fibers or andesite fibers, is between 5% by weight and 100% by weight. It would also be possible to use mixtures of glass and carbon fibers, in which case the proportion of carbon fiber relative to the total quantity of glass and carbon fibers may be between 20% by weight and 80% by weight.

The term "continuous" used in connection with the mineral fibers 5 is used in accordance with standard technical terminology used in respect of fibers. Accordingly, continuous fibers have a length of at least one meter. These are therefore not short or long fibers.

The continuous mineral fibers 5 are produced by the melt spinning process in particular.

Hereafter, only the expression "mineral fiber 5" will be used. The term "continuous" should be taken as read.

A first part of the mineral fibers 5 is supplied from the device 4 for preparing continuous mineral fibers 5 for use in the method of producing the reinforcement rod 2. This device 4 for supplying continuous mineral fibers 5 is provided in the form of a creel in particular. Disposed in the creel is a corresponding number of spools 9, mounted so as to be rotatable or stationary, i.e. non-rotatable. In the case of the rotatably mounted spools 9, the mineral fibers 5 are pulled from outside whilst the stationary spools 9 are pulled from inside.

Figures 2, 3:
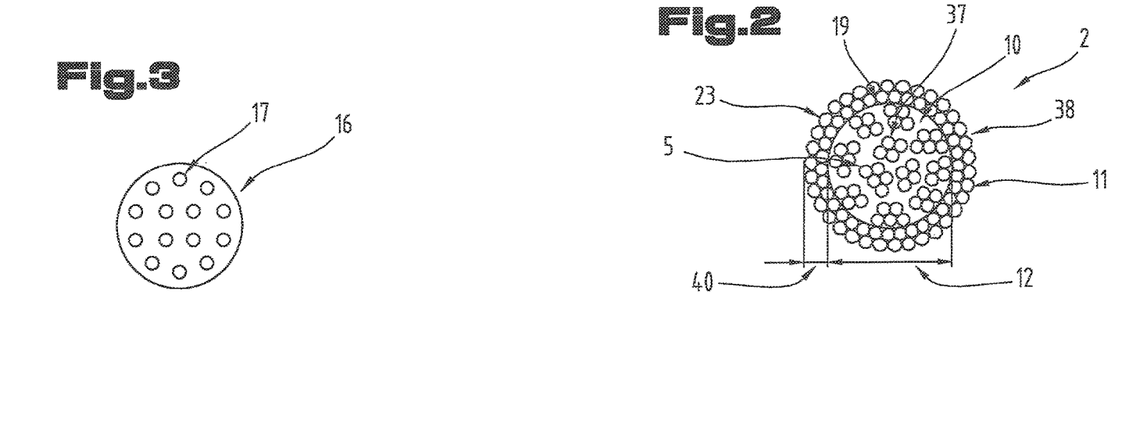
FIG. 2 a cross-section through a reinforcement rod.
FIG. 3 a scraper device viewed from the front.

As may be seen from FIG. 2, the reinforcement rod 2 comprises or consists of a core rod 10 and a peripheral laminate 11 surrounding the core rod 10.

However, it should be pointed out that it would also be possible for the reinforcement rod 2 to consist of only the core rod 10, as will be explained below.

The number of spools 9 will depend on the number of mineral fibers 5 disposed in the core rod 10. A separate spool 9 is used for each individual mineral fiber 5 in the core rod 10. In particular, the number of spools 9 may depend on a desired core rod diameter 12 of the core rod 10.

It should be noted at this stage that a mineral fiber 5 may comprise or consist of several filaments. In this case, the mineral fiber 5 may also be referred to as a roving. Alternatively, however, another option is to use mineral fibers 5 in the form of so-called monofilaments.

Accordingly, the plant 1 may therefore have a separate spool for every mineral fiber roving or for every monofilament.

There are also various possible combinations comprising or consisting of mineral fiber rovings and monofilaments. To obtain better mechanical properties, however, mineral fiber rovings are used.

The creel itself may be a simple frame-type rack in which the spools 9 are distributed on several levels. The spools 9 may be disposed so that they are standing or lying relative to the spool axis.

Instead of being disposed on a creel, the mineral fibers 5 may be held in readiness already cut to a pre-definable length.

Instead of a creel, the spools 9 may also be retained in racking if the mineral fibers 5 are pulled from the interior of the spool 9 (so-called center pull).

The mineral fibers 5 are conveyed from the device 4 for supplying continuous mineral fibers 5 into the device 6 for mixing the mineral fibers 5 with resin 7, in particular pulled.

The device 6 for mixing the mineral fibers 5 with resin 7 is preferably designed as a bath in which the resin 7 is contained. The bath may be designed so that it extends lengthways in the production direction indicated by arrow 3. In other words, the bath may have a length in the production direction indicated by arrow 3 which is greater than a width perpendicular to the production direction indicated by arrow 3. For example, the length of the bath in the production direction may be selected from a range of 2 m to 20 m. As a result, the mineral fibers 5 are sufficiently wetted or mixed with the resin so that on leaving the device 6 for mixing the mineral fibers 5 with resin 7, the mineral fibers 5 have a resin coating, preferably on the entire surface in the longitudinal direction.

The depth of the bath may be selected from a range of 0.15 in to 2 m, in particular from a range of 0.15 m to 1 m. The advantage of flatter baths is that the mineral fibers 5 need to be deflected to a lesser degree for dipping in the resin 7.

To ensure that the mineral fibers 5 are dipped into the resin 7, the bath may be equipped with appropriate apparatus, for example one or more rotatably mounted rolls 13 (e.g. disposed respectively one in the region where the mineral fibers 5 are dipped into the resin 7 and one in the region where the mineral fibers 5 are moved out of the resin), which lie in particular on at least one resin bath surface 14 and preferably are also immersed in the resin bath. The apparatuses lie with their longitudinal extension extending transversely to the production direction indicated by arrow 3.

To avoid interruptions to processing, it is preferable to use rolls 13 or cylinders that are non-rotatable, i.e. that are fixed and stationary. The advantage of this is that if fibers break or filaments break, fibers or filaments are not wound onto the rolls 13.

Instead of a bath, another option would be to use a spray plant to spray the resin 7 onto the mineral fibers 5 or a coating device by means of which the mineral fibers 5 are coated with the resin or one or more applicator rolls (=impregnator rolls), optionally having a flexible surface, which are partially immersed or submerged in the resin so that resin from a resin bath is transferred onto the mineral fibers 5 as they are guided at a tangent across the applicator roll(s) and touch them. However, the preferred design of the device 6 for applying resin 7 to the mineral fibers 5 is that based on a bath.

Above the device 6 for applying resin 7 to the mineral fibers 5, an appropriate suction system may be provided, if necessary with a suction hood, by means of which the steam rising from the resin can be evacuated.

The device 6 for applying resin 7 to the mineral fibers 5 may also be provided with at least one device for feeding in resin 7, in particular a pipe, especially on an automated basis so that the quantity of resin or volume of resin can be kept at least more or less constant, especially in the bath, and the spent quantity of resin 7 can be replaced after specific time intervals, i.e. topped up with fresh resin 7.

The resin 7 lies in the device 6 for applying resin 7 to the mineral fibers 5 in a non-crosslinked or pre-crosslinked state with a low degree of crosslinking so that the resin 7 is liquid.

Furthermore, the resin 7 in the device 6 for applying resin 7 to the mineral fibers 5 is preferably already mixed with a curing agent, i.e. a crosslinking agent. The quantity of curing agent may be between 0.3% by weight and 50% by weight. The quantity of curing agent will depend on the resin 7 used and in the case of a vinyl ester resin may be between 0.5% by weight and 5% by weight for example, and for an epoxy resin between 20% by weight and 50% by weight, relative to the total quantity of the mixture formed by the resin 7 and curing agent.

The resin used is preferably a vinyl ester resin. However, other thermosetting resins may also be used, such as for example a polyester resin or an epoxy resin or a phenolic resin or a matrix system based on a polyurethane. It would also be possible to use a mixture of different resins. The expression "different" not only refers to different types of resin but may also refer to the use of a mixture of resins of one type but having different properties, for example a mixture of at least two vinyl ester resins with different crosslinking behavior. For example, resins with different functional groups or different molecular weights may be used in order to adapt the property profile of the reinforcement rod 2. Particularly preferably, the resin used is a vinyl ester with a base of bisphenol A epoxy dissolved in styrene or a vinyl ester resin with a base of novolak.

Within the meaning of this description, the curing agent is a chemical compound which causes or initiates crosslinking of the resin 7 or resins 7 when energy is applied. Depending on the type of curing agent, the requisite energy may be applied in the form of heat, radiation, for example UV radiation, etc.

However, it would also be possible to use a curing agent which is capable of starting or initiating the crosslinking reaction without additional energy input based on a reaction with functional groups of the resin 7. Such a curing agent might be a diisocyanate, for example, and is used exclusively or preferably in combination with curing agents from the group of radical formers.

Examples of diisocyanates which may be used are toluene-2,4-diisocyanate (TDI), diphenyl methane diisocyanate or methylene diphenyl diisocyanate (MDI), hexamethylene diisocyanate (HMDI), polymeric diphenyl methane diisocyanate (PMDI), isophorone diisocyanate (IPDI), dicyclohexylmethane-4,4'-diisocyanate (H12MDI).

However, diisocyanates other than those mentioned above may also be used.

The quantity of the at least one diisocyanate may be selected from a range of 5% by weight to 30% by weight, preferably from a range of 10% by weight to 20% by weight, this quantity being relative to the weight of the resin.

As a curing agent, i.e. starter of the crosslinking reaction, however, it is also possible to use at least one photoinitiator.

For example, the photoinitiator may be benzophenone, phenylbis(2,4,6-trimethylbenzoyl)phosphine oxide, 2,2-dimethoxy-1,2-diphenylethan-1-one.

However, photoinitiators other than the ones mentioned above may also be used.

The quantity of the at least one photoinitiator may be selected from a range of 0.5% by weight to 5% by weight, preferably from a range of 1% by weight to 3% by weight, this quantity being relative to the weight of the resin.

The resin 7 may be applied to the surface of the mineral fibers 5 at room temperature. However, it is also possible to heat the resin 7 slightly but not to the degree that it causes the process of curing the resin 7 to be initiated in the device 6 for applying resin 7 to the mineral fibers 5. For example, the temperature of the resin 7 in the device 6 for applying resin 7 to the mineral fibers 5 may be between room temperature (=20° C.) and 35° C.

In the preferred embodiment of the plant 1, a scraper device 15 for removing a part of the resin 7 applied to the mineral fibers 5 is disposed downstream of the device 6 for applying resin 7 to the mineral fibers 5 in the production direction indicated by arrow 3.

This scraper device 15 is preferably provided in the form of a perforated plate 16, as may be seen from FIG. 3. The perforated plate 16 has several bores 17 through which the mineral fibers 5 entraining the resin 7 and ((over-)saturated) with it are pulled.

The clearance width of the bores 17 is dimensioned so that a mineral fiber 5 or a bundle of mineral fibers 5 can be pulled through with some "clearance", as will be explained in more detail below, and the clearance is adapted to the amount of resin to be left on the mineral fibers 5 or mineral fiber bundle. For example, the clearance may be between 0.5 mm and 5 mm. However, the "clearance" should not be so big that no resin 7 is scraped off but rather a back-pressure builds which scrapes off a defined amount of resin. This enables the amount of fiber mass in the reinforcement rod 2 to be set.

Instead of bores 17 and/or in addition to the bores 17, it would also be possible to provide orifices with a geometry that is not circular, for example orifices with an oval, quadrangular, hexagonal, octagonal cross-section, etc.

The bores 17 and/or orifices in the perforated plate 16 are preferably disposed so that the mineral fibers 5 or mineral fiber bundles are pulled through at a distance from one another but they are also already oriented such that the position in the core rod 10 is imparted by the reduction of this distance. In other words, the perforated plate 16 reproduces the disposition of the mineral fibers 5 or mineral fiber bundles in the core rod 10 in the manner of an exploded diagram because the bores 17 and/or orifices are spaced apart from one another. The bores 17 or orifices are therefore disposed in particular on one or more concentric circles.

In principle, however, it is also possible to use more than one scraper device 15.

In this respect, it is also possible to provide several or at least two scraper devices 15 next to one another. Likewise, several or at least two or three or four, etc., scraper devices 15 may be disposed one after the other in the production direction indicated by arrow 3, in which case the bores or orifices of the downstream, i.e. second, perforated plate in the production direction are of smaller dimensions than the bores 17 or orifices of the upstream, first perforated plate 16.

Generally speaking, the diameter of the bores 17 or clearance width of the orifices reduces in steps if several scraper devices are provided one after the other so that the amount of resin which adheres to a mineral fiber 5 or to a mineral fiber bundle becomes less in steps.

The perforated plate 16 is preferably made from a material which affords low adhesion for the resin 7. For example, the perforated plate 16 may be provided in the form of a flexible flexi-scraper. Another option is for the perforated plate 16 to be made from this material only in the region of the bores 17 or orifices, or the bores 17 or orifices are faced with this material. The flexible flexi-scraper may be made from an elastomer, for example selected from a group comprising or consisting of SBR, NBR, NR, XNBR, IR, or a thermoplastic elastomer or may contain one.

Instead of a flexible flexi-scraper, it would also be possible to use a rigid material for the scraper device 15, for example a hard metal. This enables better shaping of the mineral fiber tow to be obtained.

Combined embodiments are also possible if several scraper devices 17 are disposed one after the other in the production direction indicated by arrow 3. For example, a first scraper device 17 might be made from a hard metal or might be so in the region around the bore(s) 17 or orifice or orifices. Another scraper device disposed after the first scraper device 17 in the production direction may be the flexible flexi-scraper of the type described above. It is also possible for other additional scraper devices 17 to be provided between the first scraper device 17 and the other scraper device 17, which in turn are made from a hard metal or are so in the specified region, for example.

Instead of a perforated plate 16, the scraper device 15 may also be of a different design. For example, the scraper device 15 may be provided in the form of a nozzle or slotted nozzle through which the mineral fiber(s) 5 is or are pulled or in the form of two counter-rotating scraper rolls. Again, it is also possible to provide several scraper devices 15 next to one another and/or one after the other in the production direction indicated by arrow 3.

Disposed downstream of the device 6 for applying resin 7 to the mineral fibers 5 and downstream of the scraper device 15 if the scraper device 15 is integrated in the plant 1, and before the device 8 for curing the resin 7 in the production direction is at least one device 18 for winding a strand 19 or strip onto the mineral fibers 5 entraining the resin 7. If necessary, a scraper device 15 may also be provided in the region of or in the device 18 for winding the strand 19 or strip onto the mineral fibers 5 entraining the resin 7.

Before reaching this device 18 for winding the strand 19 or strip onto the mineral fibers 5 entraining the resin 7, the mineral fibers 5 are already bundled, i.e. are moved closer to one another to the extent that they have essentially already assumed the relative positions relative to one another that they will assume in the finished core rod 10.

The mineral fibers 5 entraining the resin 7 may be wound in the form of a simple spiral winding. This is done on the basis of the forward movement of the mineral fibers 5 in the production direction on the one hand and the strand 19 fed in at an angle 20 relative to the production direction, which may be between 10° and 90° for example.

In the most basic situation, therefore, the device 18 comprises a rotatably mounted spool 21, from which the strand 19 or strip is unreeled. However, it also possible for a center-pull winding from the spool 21, as explained above. The rotatable mounting of the spool 21 is therefore not absolutely necessary.

It is also possible to provide more than one spool 21, for example two or three, etc., which likewise generate a spiral winding of identically oriented strands 19 or strips.

In the preferred embodiment of the plant 1, however, a cross-winding is created by means of several spools 21, in particular two, so that the strands 19 or strips are applied to the mineral fibers 5 in opposite directions. To this end, as illustrated in FIG. 1, one spool 21 may be disposed above and one spool 21 underneath the mineral fiber tows or one spool to the left and one spool to the right, next to the mineral fiber tow.

By cross-winding within the meaning of the invention is meant a winding involving the winding of at least two strands so that the strands cross over, i.e. form crossover points.

The mineral fiber tow wound with the strand 19 or strip is then fed to the device 8 for curing the resin 7, in which at least partial crosslinking of the resin 7 takes place.

Depending on the type of curing agent used, the device 8 for curing the resin 7 may be a heating line, an irradiating device, for example for emitting UV light, etc. If, because of the curing agent used, no additional energy input is necessary to initiate the curing process, the device 8 may be provided in the form of a simple (conveyor) line.

The heating line may also be made up of several heating zones, each at a different temperature so that crosslinking of the resin 7 does not occur abruptly but takes place over a pre-definable period. The heating lines may also be split between several devices 8 for curing the resin 7, each of which is at an approximately constant temperature and disposed one after the other.

If the device 8 for curing the resin 7 has an irradiator device, several such irradiator devices may be provided, which optionally irradiate the resin 7 with different doses of energy.

In principle, it is also possible to provide several devices 8 for curing the resin 7 adjacent to one another in the situation where several reinforcement rods 2 are produced in parallel.

Appropriate suction systems may be provided in the region of the device 8 for curing the resin 7 in order to evacuate the vapors given off by the resin.

If the device 8 for curing the resin 7 has one or more heating lines, these may be designed as tunnels through which the mineral fiber bundle is pulled. Air is then preferably fed in from the ends of the heating passages or heating tunnels.

Once the mineral fiber bundle has left the device 8, the core rod 10 is ready to the degree that it can be provided with the peripheral laminate 11.

If no peripheral laminate 11 is to be applied to the core rod 10, it is now ready for the process of curing the resin 7. If necessary, a finish can be applied, as will be explained below.

In order to produce the peripheral laminate 10, at least one other device 22 for supplying other continuous mineral fibers 23 and at least one other device 24 for applying another resin 25 to the other mineral fibers 23 are disposed downstream of the device 8 for at least partially curing the resin 7 of the core rod 10 in the production direction indicated by arrow 3 or parallel with the plant parts of the plant 1 described above, through which the other mineral fibers 23 are conveyed. At least one other scraper device 26 may also be provided downstream of the other device 24 for applying another resin 25 to the other mineral fibers 23 in order to remove a part of the other resin 25 applied to the other mineral fibers 23.

The other device 22 for supplying other continuous mineral fibers 23 is preferably of the same design as the device 4 for supplying continuous mineral fibers 5. Reference may therefore be made to the explanation given above. In principle, the device 22 for supplying other continuous mineral fibers 23 may also be different from the device 4 for supplying continuous mineral fibers 5.

The other device 24 for applying the other resin 25 to the other mineral fibers 23 is preferably of the same design as the device 6 for applying resin 7 to the mineral fibers 5. Reference may therefore be made to the explanation given above. In principle, the other device 24 for applying the other resin 25 to the other mineral fibers 23 may also be different from the device 6 for applying resin 7 to the mineral fibers 5. For example, the other device 24 for applying the other resin 25 to the other mineral fibers 23 may be a spraying device and the device 6 for applying resin 7 to the mineral fibers 5 may also be a dipping bath.

The other scraper device 26 is preferably of the same design as scraper device 15, being provided in particular in the form of a perforated plate or nozzle. Reference may therefore be made to the explanation given above. In principle, however, the other scraper device 26 may also be different from scraper device 15.

The other mineral fibers 23 are selected from the group of possible mineral fibers specified above in connection with mineral fibers 5. Reference may therefore be made to the explanation given above. Accordingly, the peripheral laminate 11 contains the same mineral fibers as the core rod 10. By preference, both mineral fibers 5 and the other mineral fibers 23 are vulcanite fibers, in particular basalt fibers or andesite fibers.

However, combined variants are also possible, in which case the mineral fibers 5 of the core rod 10 may be glass or carbon fibers and the other mineral fibers 23 may be vulcanite fibers, in particular basalt fibers or andesite fibers, for example, or vice versa.

The other resin 25 may be selected from the group of possible resins specified above in connection with resin 7. Reference may therefore be made to the explanation given above. In particular, both the resin 7 and the other resin 25 may be a vinyl ester resin.

However, combined variants are also possible, in which case the resin 7 of the core rod 10 is an epoxy resin and the other resin 25 of the peripheral laminate 11 is a vinyl ester resin, for example.

By combined variants in connection with the resin is also meant that both the resin 7 and the other resin 25 may be the same type of resin but these resins may differ in terms of the number of crosslinking points or in terms of molecular weight, etc.

The other mineral fibers 23 entraining the other resin 25, if necessary after scraping off a part of the other resin 25 that was applied, are then fed to the core rod 10 and this takes place between the device 8 for curing the resin 7 and another device 27 for curing the other resin 25 and optionally a final curing of the resin 7 of the core rod 10.

The other device 27 for curing the other resin 25 and optionally running a final curing of the resin 7 of the core rod 10 may be of the same design as device 8 for at least partially curing the resin 7. Reference may therefore be made to the explanation given above in connection with device 8 for at least partially curing the resin 7.

The device 27 for curing the other resin 25 and optionally miming a final curing of the resin 7 of the core rod 10 is also preferably provided in the form of a heating device, in particular a heating passage with a heating tunnel or preferably several heating tunnels at different temperatures.

The temperature in the device 8 for at least partially curing the resin 7 and/or in the device 27 for curing the other resin 25 and optionally for the final curing of the resin 7 of the core rod 10 may be controlled so that an initial temperature in a first range prevails and then a second temperature a second range which is higher than the initial temperature, and following this range is a third range in which a temperature prevails that is lower or higher than in the second range.

For example, a set temperature in the first temperature range may be selected from a range of 50° C. to 500° C., in the second temperature range selected from a range of 250° C. to 600° C., and in the third temperature range selected from a range of 75° C. to 500° C.

It should be pointed out that the set temperatures are those to which the heating device, in particular the IR irradiators, are set. Due to the conditions prevailing in the heating tunnels, the temperatures are obtained at which the process of curing the resin 25 and optionally the resin 7 takes place.

At this stage, it should be noted that—although not illustrated—it is possible for corresponding devices to be provided in the plant 1 to prevent the individual mineral fibers 5 entraining the resin 7 and/or the individual other mineral fibers 23 entraining the other resin 25 from sticking together prior to curing the resin 7 and the other resin 25 or prior to deliberately bringing the mineral fibers 5 and/or other mineral fibers 23 together. These devices may be provided in the form of rakes, for example, between the tines of which the individual mineral fibers 5 or other mineral fibers 23 or fiber bundles comprising mineral fibers 5 or other mineral fibers 23 are guided.

The peripheral laminate 11 is formed in such a way that the other mineral fibers 23 entraining the other resin 25 or the other mineral fiber bundles are disposed in an at least approximately circular arrangement around the (cross-) wound core rod 10. The core rod 10 is therefore surrounded by the peripheral laminate 11, in particular completely surrounded by it. To this end, at least one device may be provided in the plant 1 in the region where the core rod 10 is brought together with the mineral fibers 23 entraining the other resin 25, which enables the other mineral fibers 23 to be guided accordingly. For example, a perforated plate may also be used for this purpose, which has an appropriate orifice, in particular a bore, in the middle adapted to the diameter of the core rod 10 to allow the core rod 10 to be fed through unhindered.

Optionally, the at least one other scraper device 26 and this device for guiding the other mineral fibers 23 may constitute a single unit.

The reinforcement rod 2 has a surface structure on its surface, making it easier to embed it in the material to be reinforced.

In order to produce this surface structure, a winding device 28 is provided upstream of the other device 27 for curing the other resin 25 and optionally running the final curing of the resin 7. In the most basic embodiment, this winding device 28 has at least one spool 29, from which another strand 30 or another strip is unreeled and pressed into the as yet uncured other resin 25. This pressing-in action is achieved by setting an appropriate tension for the other strand 30 or other strip.

The at least one other strand 30 or the at least one other strip may be wound in the manner of a (simple) spiral winding around the other mineral fibers 23 of the peripheral laminate 11 so that a thread-type surface structure will be obtained once the other resin 25 on the peripheral laminate 11 has cured.

Disposed downstream of the device 27 for curing the other resin 25 and optionally running the final curing of the resin 7 in the production direction indicated by arrow 3 is at least one reeling device 31. In the most basic embodiment, this at least one reeling device 31 has at least one spool 32, onto which the at least one other strand 30 or at least one other strip that has been pulled off the cured peripheral laminate 11 is reeled again. When the at least one other strand 30 or at least one other strip is removed, an impression left behind by it will form the surface structure in the cured peripheral laminate 11.

After curing the peripheral laminate 11 and optionally running the final curing of the core rod 10 in the other curing device 27, the reinforcement rod 2 is finished.

All of the mineral fibers 5, 23, 35 are preferably completely embedded in the resin matrix in the finished reinforcement rod 2, i.e. it has only a resin layer on the outside with the exception of the end faces of the reinforcement rod 2.

Since the plant 1 is preferably operated continuously, the reinforcement rod 2 still has to be cut to the desired length, for which purpose a sawing device 33 or cutting device may be provided in the plant 1 downstream of the device 27 for curing the other resin 25 and optionally running the final curing of the resin 7.

Based on one embodiment of the plant 1, and hence the method of producing the reinforcement rod 2, a third device 34 for feeding resin-free continuous mineral fibers 35 may be provided upstream of the other device 27 for curing the other resin 25 and optionally running the final curing of the resin 7, as indicated by broken lines in FIG. 1.

This third device 34 for feeding resin-free continuous mineral fibers 35 is disposed in particular downstream of the other device 24 for applying the other resin 25 to the other mineral fibers 23 in the production direction indicated by arrow 3.

The third device 34 for supplying resin-free continuous mineral fibers 35 is preferably of the same design as device 4 for supplying the continuous mineral fibers 5. Reference may therefore be made to the explanations given above. In principle, the third device 34 for supplying resin-free continuous mineral fibers 35 may also be different from device 4 for supplying the continuous mineral fibers 5.

However, another option is to combine this third device 34 for feeding resin-free continuous mineral fibers 35 with the other device 22 for feeding the other mineral fibers 23. In this case, the resin-free mineral fibers 35 are not fed through the other device 24 for applying the other resin 25 to the other mineral fibers 23.

The resin-free mineral fibers 35 are selected from the group of possible mineral fibers specified in connection with mineral fibers 5. Reference may therefore be made to the explanations given above. Accordingly, the peripheral laminate 11 contains the same mineral fibers as the core rod 10. Both mineral fibers 5 and the other mineral fibers 23 and the resin-free mineral fibers 35 are preferably vulcanite fibers, in particular basalt fibers or andesite fibers.

However, combined variants are also possible, in which case the mineral fibers 5 of the core rod 10 may be glass or carbon fibers and the other mineral fibers 23 are vulcanite fibers, in particular basalt fibers or andesite fibers, and the resin-free mineral fibers 35 are vulcanite fibers, in particular basalt fibers or fibers, or glass fibers or carbon fibers or vice versa.

The quantity of resin-free mineral fibers 35 relative to the total quantity of mineral fibers of the peripheral laminate may be between 10% by weight and 80% by weight, in particular between 20% by weight and 50% by weight.

It is possible for the mineral fibers 5 and/or the other mineral fibers 23 and/or the resin-free mineral fibers 35 to have a different diameter or a different titer from one another. For example, the other mineral fibers 23 and/or the resin-free mineral fibers 35 may have a bigger diameter than the mineral fibers 5 or vice versa. It is also possible for the mineral fibers 5 and/or the other mineral fibers 23 and/or the resin-free mineral fibers 35 to be produced respectively from filaments which have a different diameter from one another so that whilst the diameter of the mineral fibers 5 and the other mineral fibers 23 and the resin-free mineral fibers 35 is the same, they are made up of a different number of mineral fiber filaments.

In principle, however, it is also possible to feed in resin-free mineral fibers for producing the core rod 10. In this connection, reference may be made to the explanations given with respect to the process of feeding in the resin-free mineral fibers 35 for producing the peripheral laminate 11. The corresponding device(s) is or are provided in the plant 1 upstream of the device 8 for at least partially curing the resin 7 of the core rod 10.

Based on another embodiment of the plant 1, and hence the method of producing the reinforcement rod 2, after the process of curing the other resin 25 of the peripheral laminate 11 and optionally the final curing of the resin 7 of the core rod 10 and after removing the other strand 30 or the other strip, another layer of resin is applied to the peripheral laminate 11. To this end, a third device 36 for applying a thin resin layer to the reinforcement rod 2 may be provided in the plant 1, as indicated by broken lines in FIG. 1. This third device 36 for applying a thin resin layer to the reinforcement rod 2 is disposed downstream of the reeling device 31 in the production direction indicated by arrow 3.

This third device 36 is preferably of the same design as device 6 for applying resin 7 to the mineral fibers 5. Reference may therefore be made to the explanations given above in this connection. In principle, the third device 36 may be different from device 6 for applying resin 7 to the mineral fibers 5. It is therefore possible for the third device 36 to be provided in the form of a spraying device and the device 6 for applying resin 7 to the mineral fibers 5 as a dipping bath, for example.

The resin for the thin resin layer may be selected from the group of possible resins specified above in connection with resin 7. Reference may therefore be made to the explanations given above in this connection. In particular, both resin 7 and the other resin 25 and the resin for the thin resin layer are a vinyl ester resin. If different resins are used for the core rod 10 and/or peripheral laminate 11 and/or the thin, outer resin layer, it is of advantage if the thin, outer resin layer is a vinyl ester resin due to its better alkali resistance.

The thin resin layer has a maximum layer thickness of 200 μm. In particular, the layer thickness of the thin resin layer is selected from a range of 5 μm to 100 μm.

In order to cure this thin resin layer, a device corresponding to that described above may be provided in the plant. However, the curing process may also take place using air without using any special device.

It is preferable if all the mineral fibers, i.e. mineral fibers 5 of the core rod 10 and the other mineral fibers 23 of the peripheral laminate 11 as well as the optional resin-free mineral fibers 35, are oriented in the longitudinal direction of the reinforcement rod. This can be achieved by pulling the mineral fibers or reinforcement rod 2 using a conveyor device in the end region of the plant. The conveyor device might be, for example, a caterpillar puller or a belt puller. Other conveyor devices are, for example, chain pullers and gripper devices by means of which the reinforcement rod 2 can be pulled in an at least partially clamped arrangement.

At this stage, it should be noted that the resin-free mineral fibers 35 in the finished reinforcement rod 2 are also covered by the resin 7 and the other resin 25 and the resin of the thin resin layer. The expression "resin-free" merely means that no separate device is provided for these mineral fibers 35 for applying a resin to the mineral fibers. The purpose of these resin-free mineral fibers 35 is to increase the amount of mineral fiber in the reinforcement rod 2 so that the resin-free mineral fibers 35 can take up excess resin 7 or 25 of the core rod 10 or peripheral laminate 11 when the mineral fibers are brought together.

The expression "orientation in the longitudinal direction" within the meaning of the invention also includes a certain amount of undulation of mineral fibers caused by the winding process for producing the surface structure of the reinforcement rod 2. If the at least one strand 19 or the at least one strip used for the winding of the core rod 10 is a mineral fiber strand or strip, this naturally does not fall within this definition.

Furthermore, all the mineral fibers, i.e. the mineral fibers 5 of the core rod 10 and the other mineral fibers 23 of the peripheral laminate 11 and optionally the resin-free mineral fibers 35, preferably extend uninterrupted across the entire length of the reinforcement rod 2.

The strand 19 and/or the other strand 30 preferably has or have a diameter selected from a range of 0.03 mm to 6 mm, in particular from a range of 0.03 mm to 0.35 mm. Furthermore, the strand 19 and/or the other strand 30 may have a linear density selected from a range of 10 tex to 6000 tex, in particular from a range of between 80 tex and 280 tex.

For example, the strand 19 may have a diameter of 0.05 mm and a titer of 14 tex.

The other strand 30 may have a diameter of 0.3 mm to 6 mm and a titer of 4800 tex, for example.

The strand 19 and/or the other strand 30 and/or the strip and/or the other strip may be made from an organic polymer selected from a group comprising spinnable polymers, e.g. polyamide, polyester, etc. The strand 19 and/or the other strand 30 and/or the strip and/or the other strip may also be made from mineral fibers, e.g. vulcanite fibers, in particular basalt fibers or andesite fibers, glass fibers, carbon fibers.

For example, a polyamide yarn may be used for the strand 19. The advantage of this over other polymers is that it shrinks under the effect of temperature and thus imparts additional stability to the reinforcement rod 2.

The other strand 30 may be a polyester yarn. The advantage of this is that high tension can be applied during winding if necessary.

Based on another embodiment of the invention mentioned above, the resin for producing the core rod 10 may be only partially cured prior to applying the peripheral laminate 11 in the device 8 for curing the resin. In particular, the resin 7 for producing the core rod may be cured to a curing degree, in accordance with DIN 53765 (determining glass transition temperature), of at most 50% prior to applying the peripheral laminate. Accordingly, a certain partial crosslinking of the peripheral laminate 11 to the core rod 10 can be achieved.

It is also preferable if the core rod 10 is not cooled to room temperature prior to applying the other mineral fibers 23 entraining resin for the peripheral laminate 11. In particular, the core rod 10 may be at a temperature of between 50° C. and 100° C., in particular between 60° C. and 80° C., when applying the other mineral fibers 23 entraining resin for the peripheral laminate 11. A separate heating device for heating the core rod 10 may be provided in the plant 1 for this purpose. If the resin 7 of the core rod 10 was only partially cured, this temperature should not be so high that the resin 7 is prematurely cured before the peripheral laminate 11 is formed.

The speed at which the strand 30 or the other strip is wound onto the peripheral laminate may be selected from a range of 50 r/min to 1800 r/min.

The speed at which the strand 19 or strands 19 or the strip or strips are wound onto the as yet uncured core rod 10 may be selected from a range of 100 r/min to 5000 r/min, in particular from 250 r/min to 3000 r/min.

The speed at which the reinforcement rod 2 is pulled may be selected from a range of 0.5 m/min to 12 m/min.

The other strand 30 or the other strip may be applied to the as yet uncured peripheral laminate 11 with a force acting on it or them selected from a range of 1 N to 100 N.

The strand 19 or strands 19 or the strip or strips may be applied to the as yet uncured core rod 10 with a force acting on it or them selected from a range of 1 N to 50N. However, it is also possible to wind the strand 19 or strands 19 as a whole on the core rod 10 without any tension, especially if a shrinkable strand is used, as mentioned above.

The strip or strips and/or the or the other strip or strips may have a strip width selected from a range of 0.01 mm to 3.5 mm.

The reinforcement rod 2 may have in the core rod, not least due to the method of producing it, a total quantity of mineral fibers, relative to the total quantity of mineral fiber-resin, of between 81% by weight and 89% by weight, the rest being made up by the quantity of resin.

The total quantity of mineral fibers in the reinforcement rod 2 may be between 70% by weight and 89% by weight, in particular between 81% by weight and 89% by weight. The quantity of resin makes up the rest to 100% by weight, relative to the total content of resin and mineral fibers of the reinforcement rod 2. The total quantity of mineral fibers comprises the mineral fibers 5, the other mineral fibers 23 and optionally the resin-free mineral fibers 35. The quantity of resin relates to resin 7 of the core rod and the other resin 25 of the peripheral laminate. Not included in this quantity is the quantity of the thin resin layer which can be applied to the peripheral laminate 11 as a finish. Taking this additional resin content into account, the quantity of resin is increased by at most 0.5% by weight. The reinforcement rod 2 can therefore have a relatively high mineral fiber content, as a result of which its mechanical properties can be improved.

Not taken into account in the quantities of resin and mineral fibers on the reinforcement rod 2 specified above is the quantity by weight of the strand 19 or strands 19 or the strip or strips which remain on the core rod 10.

Based on another embodiment in this respect, the quantity of mineral fibers 5 in the core rod may be 10 between 80% by weight and 90% by weight, relative to the total quantity of mineral fibers in the core rod 10 and in the peripheral laminate 11. Since the core rod 10 is protected from environmental effects such as alkaline media, for example, by the peripheral laminate 11, in particular by a resin content in the peripheral laminate 11 that is preferably higher than that of the core rod 10, and since the surface structuring can be essentially limited to the peripheral laminate 11, mechanical properties, in particular tensile strength, can be improved due to the higher content of mineral fibers in the core rod 10 than the mineral fiber content of the peripheral laminate 11 because the mineral fibers 5 in the core rod 10 extend essentially longitudinally as a whole and are not undulated, i.e. are not disrupted. However, a certain degree of undulation of the surface layer of the core rod 10 is possible and admissible but does not essentially alter the mechanical properties of the core rod 10.

As explained above, based on one embodiment of the method for producing the reinforcement rod 2, the resin 7 of the core rod 10 is only partially cured in the device 8 for curing the resin 7, i.e. crosslinked. This means that during final curing of this resin 7 of the core rod and curing of the other resin 25 of the peripheral laminate 11 in the other curing device 27, a crosslinking of the resin 7 of the core rod 10 with the other resin 25 of the peripheral laminate 11 is generated so that the peripheral laminate 11 is more effectively bonded to the core rod 10.

It is also possible that the resin 7 is covalently bonded with the mineral fibers 5 of the core rod 10 and optionally the resin-free mineral fibers 35 incorporated in the core rod 10 and/or the other resin 25 are covalently bonded to the other mineral fibers 23 of the peripheral laminate 11, and optionally the resin-free mineral fibers 35 incorporated in the peripheral laminate 11 are bonded via functional groups at the surface of the mineral fibers 5, 23, 35, for example OH-groups, to the resin 7 and/or other resin 25. This results in better bonding of the mineral fibers 5, 23, 35 to the resin matrix.

As already mentioned above, based on another embodiment of the method or reinforcement rod 2, it is possible for the mineral fibers 5 and optionally 35 of the core rod 10 and/or the other mineral fibers 23 and optionally 35 of the peripheral laminate 11 to be contained in fiber bundles, in which case the core rod 10 and/or the peripheral laminate 11 may be made up of several fiber bundles. The respective individual mineral fibers 5 and optionally 35 and/or 23 and optionally 35 may therefore be brought together already to a certain extent upstream of or downstream of the device 7 for applying resin 7 or the other device 24 for applying the other resin 25 in the production direction indicated by arrow 3 thereby creating fiber bundles 37, 38 comprising several mineral fibers 5 and optionally 35 and/or 23 and optionally 35, which are then processed as described above. The reinforcement rod 2 produced as a result is illustrated in cross-section in FIG. 2. Accordingly, the entire rod body of the reinforcement rod may be made up of fiber bundles 37, 38 (together with the resin).

However, another option for producing the core rod 10 and/or the peripheral laminate 11 is to combine one or more fiber bundles 37, 38 with individual mineral fibers 5, 23, 25.

The fiber bundles 37, 38 may contain a number of individual mineral fibers 5 and optionally 35 and/or 23 and optionally 35, selected from a range of 3 to 10, in particular from a range of 4 to 8.

This being the case, it is possible for the fiber bundles 37 in the core rod 10 to have a number of mineral fibers 5 and optionally 35 selected from a range of 3 to 15.

The fiber bundles 38 in the peripheral laminate 11 may have a number of other mineral fibers 23 and optionally 35 selected from a range of 3 to 5.

Based on another option, the relative quantity of resin 7 in the core rod 10, relative to the total quantity of mineral fibers 5 optionally 35 and resin 7 in the core rod, may be different from the relative quantity of the other resin 25 in the peripheral laminate 11, relative to the total quantity of other mineral fibers 23 and optionally 35 and other resin 25 in the peripheral laminate 11.

Accordingly, the relative quantity of resin in the core rod 10 may be less than in the peripheral laminate 11. This results in a higher strength in the core rod 10 on the one hand and facilitates undulation of the peripheral laminate 11, amongst other things, on the other hand.

Another option is to take the reverse approach in terms of the relative quantity of resins.

Based on the preferred embodiment of cross-winding the core rod 10, as illustrated in FIG. 1, it is preferable if a distance 39 between two strand pieces of the strand 19 or strands 19 disposed adjacent to one another extending in the same direction is between 0.1 mm and 8 mm, in particular between 1 mm and 4 mm. On the one hand, this imparts better strength to the core rod 10 prior to curing the resin and, on the other hand, the surface quantity of resin 7 that is available for crosslinking with the other resin 25 is relatively high.

If, instead of a cross-winding, a spiral winding is provided, the distance between two strand pieces disposed adjacent to one another is likewise preferably selected from this range.

In the region where the strand 19 or strands 19 are applied to the core rod 10, a narrowing of the core rod 10 may be at most 15 μm. This narrowing is caused by winding the strand 19 or strands 19 in the tensed state. By limiting narrowing to the specified maximum value, any disruption to the straight path of the mineral fibers 5 and optionally 35 in the core rod 10 is largely avoided so that undulation is able to occur or only occurs in the surface layers of the core rod 10.

The slight narrowing can be achieved by adapting the pulling speed of the reinforcement rod 2 by the conveyor device mentioned above, in particular the belt puller, so that the strand 19 or strands 19 is or are tensed. The same applies to the strips.

The pulling speed of the reinforcement rod 2 by the conveyor device may be between 0.5 m/min and 12 m/min, in particular between 1 m/min and 5 m/min.

For details of the tension of the strand 19 or strands 19, reference may be made to the explanations given above.

A layer thickness 40 of the peripheral laminate 11 may correspond to between 5% and 15% of the maximum core rod diameter 12. As a result, the quantity of mineral fibers 5 which remain undisturbed and extend linearly in the core rod 10 is relatively high. In the case of a layer thickness 40 of the peripheral laminate 11 below 5%, the structure of the winding of the peripheral laminate 11 by the other strand 30 is imprinted in the core rod 10 to too pronounced a degree, especially if it has not fully cured. Furthermore, this will also have a detrimental effect on the desired undulation of the peripheral laminate 11. A layer thickness of the peripheral laminate 11 in excess of 15%, on the other hand, results in a core rod 10 that is too thin, for the same diameter of reinforcement rod 2, to obtain the desired high mechanical strength.

It is also preferable if the cross-winding of the core rod 10 with the strand 19 or strands 19 described above has a slimmer layer thickness so as to provide as uniform as possible a surface of the core rod 10 in readiness for applying the peripheral laminate 11.

Based on a preferred embodiment of the method for producing the reinforcement rod 2, a resin-curing agent mixture is applied to the continuous mineral fibers 5 and optionally 35 and/or 23 and optionally 35, and the resin-curing agent mixture used is a mixture of at least one of the resins specified above and at least two different curing agents, and the two curing agents form reactive species for curing the resin 7 and/or other resin 25 under different conditions so that the reactive species are available for the curing process at different times. The mixture comprising at least one resin and at least two different curing agents is applied as one so that the at least two different curing agents are applied simultaneously with the mixture. The resin-curing agent mixture comprising resin and at least two different curing agents is preferably present in the first device 6.

In particular, the vinyl ester resins mentioned above are used for this purpose.

Peroxides are preferably used as a curing agent. Aliphatic peroxides are used by preference. However, it would also be possible to use exclusively aromatic peroxides or mixtures of aliphatic and aromatic peroxides. The peroxides may be, for example, methyl ethyl ketone peroxides (MEK peroxides), which in particular have a low active oxygen content.

The peroxides may be selected from a group comprising di(tert-butylcyclohexyl)peroxydicarbonate, 5-dimethyl-2,5-di(tert-butylperoxy)hexane, 3,6,9-triethyl-3,6,9,-trimethyl-1,4,7-triperoxonane, tert-butyl peroxybenzoate, cumene hydroperoxide, 2,5-bis(tert-butylperoxy)-2,5-dimethyl-hexane and mixtures thereof.

By particular preference, three different peroxides 1 to 3 are used.

Peroxide 1 initiates crosslinking of the resin. The ensuing reaction also enables chemical bonding to the fiber surface. By increasing the temperature, the substance breaks down into active species which react with the resin. As a result, the functional groups of the resin are converted into active species which in turn react with other groups of the resin. This being the case, the resin itself is finally crosslinked.

The quantity of peroxide 1 in the resin-curing agent mixture may be between 0.2% by weight and 0.7% by weight.

Peroxide 2 fulfils the same function as peroxide 1. However, the difference resides in the fact that the breakdown into active species takes place at a higher temperature than is the case with peroxide 1.

The quantity of peroxide 2 in the resin-curing agent mixture may be between 0.8% by weight and 1.5% by weight.

Peroxide 3 fulfils the same function as peroxide 1 and 2. However, the difference resides in the fact that the breakdown into active species takes place at a higher temperature than is the case with peroxide 2.

The quantity of peroxide 3 in the resin-curing agent mixture may be between 0.7% by weight and 1.8% by weight.

The remainder making up 100% by weight of the resin-curing agent mixture is formed by the resin used.

The resin-curing agent mixture may be obtained by simply adding the curing agent to the respective resin or to the respective resin solution used.

In this connection, it should be noted that the respective resins used within the context of the invention may also be used in the form of resin solutions. The quantity of resin may then be between 30% by weight and 70% by weight. The remainder making up 100% by weight of the resin solution is formed by the solvent.

Using several different curing agents, i.e. more than one curing agent, means that the reaction, i.e. crosslinking of the resin, is slowed down. This enables the heat released as the resin is crosslinked to be dispersed more effectively and the core rod 10 and/or peripheral laminate 11 is not subjected to sudden changes in temperature, which prevents damage to the reinforcement rod 2, for example due to the formation of tears.

Generally speaking, it is preferable if the curing agent which forms the reactive species first of all is used in a quantity which is the lowest relative to the respective quantities of the other curing agents of the resin-curing agent mixture so that crosslinking starts relatively slowly.

Furthermore, to produce the core rod 10, a different curing agent system is used from that used to produce the peripheral laminate 11, in particular one curing agent fewer is used than in the resin-curing agent mixture used to produce the peripheral laminate 11. Based on this variant of the method, the resin 7 is only partially crosslinked in the curing device 8 which subsequently—as described above—has a positive effect on crosslinking with the other resin 25 of the peripheral laminate.

Figure 4:
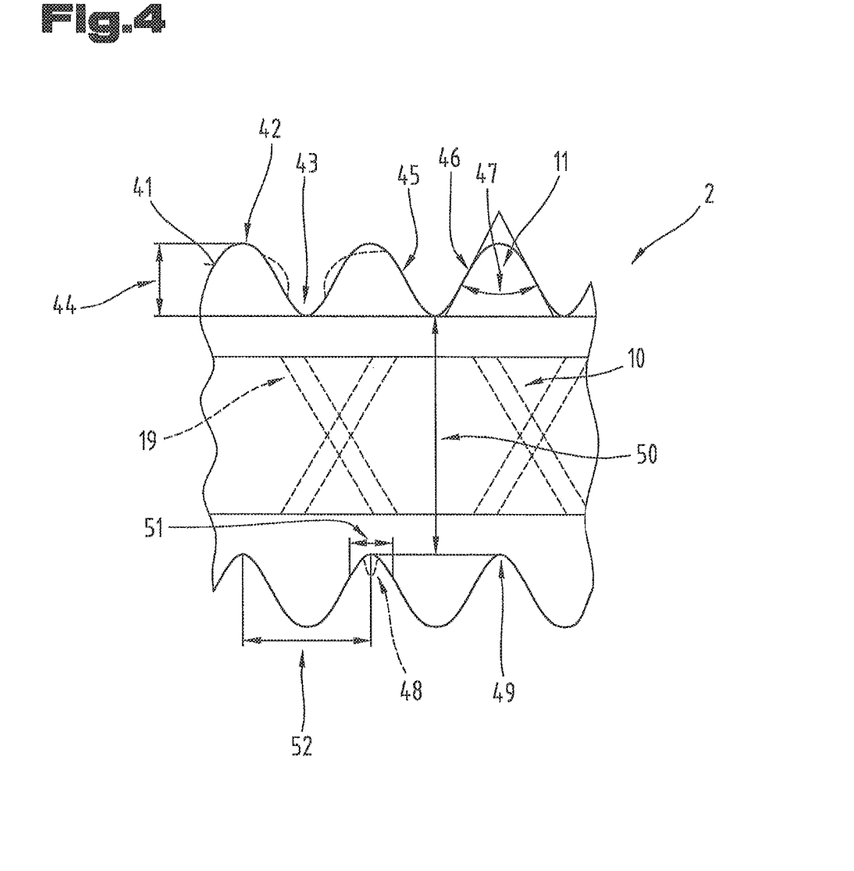
FIG. 4 a side view showing a detail of a reinforcement rod in section.

FIG. 4 illustrates a detail of an embodiment of the reinforcement rod 2 in cross-section. Clearly illustrated are the core rod 10 with the cross-winding formed by the strands 19 as well as the peripheral laminate 11 disposed on the core rod 10.

At this stage, it should be pointed out that the winding created by the strands 19 or strips, in particular the cross-winding, remains on the core rod 10, in other words the strands 19 or strips are not removed as is the case with the other strand or strands 30 or other strips.

On an outer surface of the rod body formed by the core rod 10 and peripheral laminate 11 as well as the winding on the core rod 10, a thread-type surface structure is created with ribs 42 and valleys 43.

The ribs 42 have a height 44 of at least 200 µm. In particular, the ribs 42 have a height 44 selected from a range of 300 µm to 3000 µm.

The height 44 is measured from the deepest point of the valleys 43 to the highest point of the ribs 42.

The height 44 of the ribs 42 is obtained by means of the other strand 30 (FIG. 1) and its tension (see the description above for more details). Furthermore, the height 44 of the ribs 42 may also be adjusted on the basis of the number of mineral fibers 23 used in the peripheral laminate 11 if a peripheral laminate 11 is provided or disposed on the reinforcement rod.

It should be noted that the temperature of the resin-curing agent mixture of the resin 7 for producing the core rod 10 and/or peripheral laminate 11 may be selected from a range of 15° C. to 35° C., in particular from a range of 18° C. to 31° C.

The height 44 may optionally vary across the length of the reinforcement rod 2, thereby forming ribs 42 of differing height. This can be achieved using several other strands 30 (FIG. 1) which are supplied at a different tension, for example.

The ribs 42 have rib flanks 45, 46. An opening angle 47 subtended by the rib flanks 45, 46 of a rib 42 may be selected from a range of 30° to 120°, in particular from a range of 30° to 89°. The opening angle 47 may also be adjusted using the parameters specified above in connection with the height 44 of the ribs 42. In addition, the opening angle 47 may be adjusted on the basis of the forward movement of the reinforcement rod 3, in other words the pulling speed. For more details about the pulling speed, reference may be made to the explanations given above.

The opening angle 47 is shown in FIG. 4.

The surface structure of the reinforcement rod 2 formed by the ribs 42 and valleys 43 is preferably at least approximately in the shape of a round thread.

By at least approximately is meant, amongst other things, that the rib mounds of the ribs 42 may be flattened, as indicated by broken lines on the middle top rib 42 in FIG. 4.

Based on other embodiments of the reinforcement rod 2, the related rib area f($_R$) may, in accordance with EN ISO 15630-1, be selected from a range with a lower limit of 0.05 and an upper limit of 0.15 μm.

As indicated by broken lines in FIG. 4, the rib flanks 45, 46 may have a convex contour in at least certain regions, thereby creating a sort of undercut in the region of the valleys 43.

The convex shape of the rib flanks 45, 46 can be achieved due to the fact that the at least more or less complete curing of the other resin 25 is delayed by using a curing agent system containing several different curing agents as described above.

Another option is to provide at least one protuberance 48 in the region of the valleys 43, as likewise indicated by broken lines in FIG. 4. The protuberance 48 can be created by using two or several other strands 30 instead of one, which are wound onto the peripheral laminate 11 adjacent to one another, in particular directly adjacent to one another, prior to curing it.

A radius 49 of a round region of the valleys 43 of the round thread may be selected from a range of 3 mm to 6 mm. Another strand 30 with a corresponding diameter is used for this purpose.

Furthermore, a ratio of the height 44 of the ribs 42 to a diameter (50) of the reinforcement rod core may be selected from a range of 0.03 to 0.2. The diameter 50 of the reinforcement rod core is the diameter between the valleys 43, as may be seen from FIG. 4.

A ratio of a width 51 of the ribs 42 to the diameter 50 of the reinforcement rod core may be selected from a range of 0.2 to 0.5. The width 51 of the ribs 42 is measured between the points of the rib flanks 45, 46 lying at 10% of the height 44 of the ribs 42.

Furthermore, a ratio of a pitch height 52 to the diameter 50 of the reinforcement rod core may be selected from a range of 0.04 to 0.8. The pitch height 52 is the length across which a rib 42 and an adjoining valley 43 extend in the direction of the longitudinal extension of the reinforcement rod 2. The pitch height 52 may also be measured between the deepest points of two adjacently lying valleys 43.

As mentioned at various points above, it is also possible for the reinforcement rod 2 to comprise only the core rod 10. This embodiment of the reinforcement rod 2 is used in particular if the reinforcement rod 2 is to be used in a pre-tensed arrangement in the matrix to be reinforced, in particular concrete. For this embodiment, all the explanations given above relating to the core rod 10 apply. However, in this case, the core rod 10 does not have a winding of strand 19 or strip left on it. Instead, the winding is applied with the other strand 30 or other strip for producing the desired surface structure, as explained in connection with the peripheral laminate 11.

Another option with this embodiment is to apply a finish in the form of a thin resin layer to the core rod 10 once the surface structure has been formed, in particular the round thread-like surface structure, as also explained above.

Test pieces of the reinforcement rods 2 were produced and measurements carried out on them to determine their mechanical properties. The measurements demonstrated that a "mean bond stress" in accordance with ISO 10406-1 is at least 20 MPa. Comparative measurements con-ducted on reinforcement rods known from the prior art under the same conditions gave a value of less than 15 MPa for the mean bond stress.

The tensile strength of the reinforcement rod 2 proposed by the invention was found to be in excess of 1740 MPa and the E-modulus over 65 GPa. Reinforcement rods known from the prior art, on the other hand, tested under the same conditions were found to have a tensile strength of only between 900 MPa and 1375 MPa and an E-modulus of only between 46 GPa and 63 GPa.

The embodiments illustrated as examples represent possible variants of the reinforcement rod 2 and the plant 1 for producing the reinforcement rod 2 and the individual variants may be used in different combinations with one another.

For the sake of good order, finally, it should be pointed out that, in order to provide a clearer understanding of the structure of the reinforcement rod 2 and the plant 1, they and their constituent parts are illustrated to a certain extent out of scale and/or on an enlarged scale and/or on a reduced scale.

| List of reference numbers | |
|---|---|
| 1 | Plant |
| 2 | Reinforcement rod |
| 3 | Arrow |
| 4 | Device |
| 5 | Mineral fiber |
| 6 | Device |
| 7 | Resin |
| 8 | Device |
| 9 | Spools |
| 10 | Core rod |
| 11 | Peripheral laminate |
| 12 | Core rod diameter |
| 13 | Roll |
| 14 | Resin bath surface |
| 15 | Scraper device |
| 16 | Perforated plate |
| 17 | Bore |
| 18 | Device |
| 19 | Strand |
| 20 | Angle |
| 21 | Spool |
| 22 | Device |
| 23 | Mineral fiber |
| 24 | Device |
| 25 | Resin |
| 26 | Scraper device |
| 27 | Device |
| 28 | Winding device |
| 29 | Spool |
| 30 | Strand |
| 31 | Reeling device |
| 32 | Spool |
| 33 | Sawing device |
| 34 | Device |
| 35 | Mineral fiber |
| 36 | Device |
| 37 | Fiber bundle |
| 38 | Fiber bundle |
| 39 | Distance |
| 40 | Layer thickness |
| 41 | Surface |
| 42 | Rib |
| 43 | Valley |
| 44 | Height |
| 45 | Rib flank |
| 46 | Rib flank |
| 47 | Opening angle |
| 48 | Protuberance |
| 49 | Radius |
| 50 | Diameter |
| 51 | Width |
| 52 | Pitch height |

The invention claimed is:

1. A method for producing a reinforcement rod from a fibrous composite material comprising continuous mineral fibers and at least one resin, at least one portion of the mineral fibers being mixed with a first mixture, the mineral fibers that have been mixed with the first mixture and, optionally, resin-free mineral fibers being brought together to form a core rod, and the resin being cured, wherein a number of mineral fibers are disposed in the reinforcement rod, whereas the core rod is produced in the order of
    (a) supplying the continuous mineral fibers by a first device,
    (b) mixing the mineral fibers with the resin in a second device and conveying the mineral fibers through the second device, and
    (c) curing the resin in a third device, and
        wherein the first mixture comprises the at least one resin and at least two different curing agents, and the two curing agents form reactive species under different conditions for curing the resin such that the reactive species are available at different times for the curing process,
        wherein a peripheral laminate comprising mineral fibers oriented in a longitudinal direction of the reinforcement rod and another resin is applied to the core rod,
        wherein a second mixture is used to produce the peripheral laminate, the second mixture comprising the other resin and a plurality of curing agents, and
        wherein the at least two different curing agents of the first mixture are different from the plurality of curing agents of the second mixture, in particular the at least two different curing agents of the first mixture are one fewer than the plurality of curing agents of the second mixture.

2. The method according to claim 1, wherein a curing agent of the at least two different curing agents is selected from a group comprising or consisting of diisocyanates and radical formers, in particular peroxides, azo compounds, photoinitiators, and mixtures thereof.

3. The method according to claim 1, wherein three different peroxides are used as curing agents.

4. The method according to claim 1, wherein a curing agent which forms the reactive species first of all is used in a quantity which is the lowest relative to the respective quantities of the other curing agents of the first mixture.

5. A reinforcement rod comprising a core rod and a peripheral laminate applied to the core rod, wherein the core rod, the peripheral laminate, and the reinforcement rod are produced by the method according to claim 1.

6. The reinforcement rod according to claim 5, wherein the curing agents are selected from a group comprising or consisting of diisocyanates and radical formers, in particular peroxides, azo compounds, photoinitiators, and mixtures thereof.

7. The reinforcement rod according to claim 5, wherein three different peroxides are used as the curing agents.

8. The reinforcement rod according to claim 5, wherein in terms of quantity, the quantity of the curing agent forming the reactive species first of all is the lowest relative to the respective quantities of the other curing agents in the first mixture.

9. The method according to claim 1, wherein the first mixture is applied as one so that the at least two different curing agents are applied simultaneously with the mixture.

10. The method according to claim 1, wherein the first mixture is present in the second device.

* * * * *